Aug. 23, 1966   M. H. GROVE   3,268,204
VALVE OPERATOR

Filed Aug. 29, 1962   3 Sheets-Sheet 1

MARVIN H. GROVE
INVENTOR.

BY *Flehr and Swain*

ATTORNEYS

Aug. 23, 1966   M. H. GROVE   3,268,204
VALVE OPERATOR

Filed Aug. 29, 1962   3 Sheets-Sheet 2

MARVIN H. GROVE
*INVENTOR.*

BY *Flehr and Swain*

ATTORNEYS

Aug. 23, 1966                M. H. GROVE                3,268,204
                            VALVE OPERATOR

Filed Aug. 29, 1962                                3 Sheets-Sheet 3

MARVIN H. GROVE
*INVENTOR.*

BY
ATTORNEYS

United States Patent Office 3,268,204
Patented August 23, 1966

3,268,204
VALVE OPERATOR
Marvin H. Grove, 340 Hillside Ave., Piedmont, Calif.
Filed Aug. 29, 1962, Ser. No. 220,207
5 Claims. (Cl. 251—234)

This invention relates generally to a construction of valves and in particular to valve operators used therewith.

In the past, most manual operators for valves have been of the handwheel type, with or without gearing. One difficulty with such devices is that they are relatively slow operating, requiring many turns of the handwheel to to move the valve between full open and closed position. In many instances, such as special applications in the petroleum industry and in transmission line systems for gas and other petroleum products, there is need for a simple hand operator which is relatively quick operating, while at the same time providing the mechanical advantage desidered. In general it is an object of the present invention to provide a manual operator which will be suitable for such purposes.

Another object of the invention is to provide an improved hand operator for valves, which utilizes a step-by-step lever action for moving a valve operating rod between open and closed position.

Another object of the invention is to provide an operator of the above character which can be adjusted with respect to the mechanical advantage obtained.

Another object of the invention is to provide an operator of the above character which is relatively simple, and which can be manufactured at low cost.

Referring to the drawing.

Figure 1:
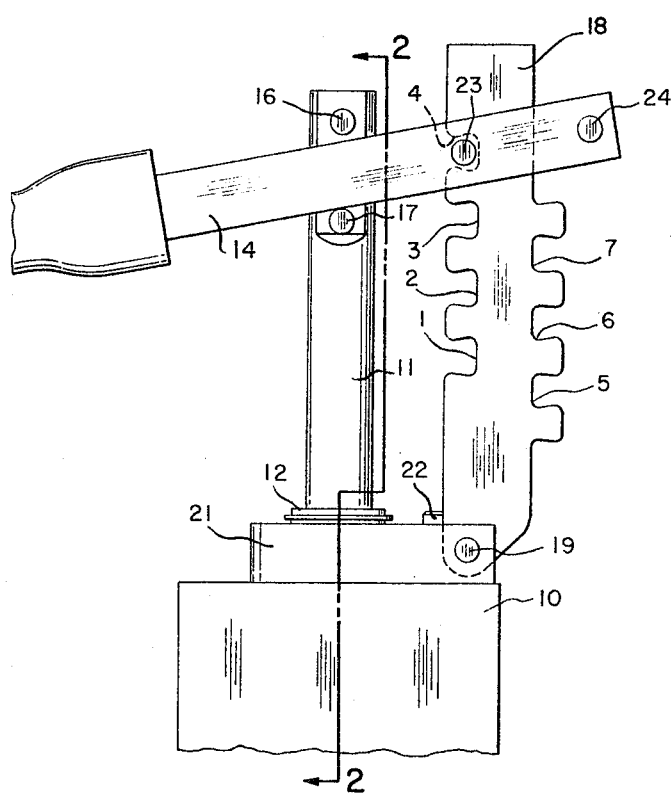
FIGURE 1 is a side elevational view illustrating a valve operator in accordance with the present invention.
Figure 2:
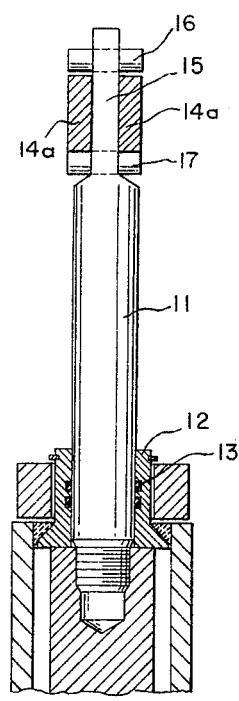
FIGURE 2 is a cross-sectional view taken along the line 2—2 of FIGURE 1.

In FIGURES 1 and 2 I have illustrated a portion of a valve body 10, which may for example be a valve suitable for use with relatively high pressures, and which has a balanced gate or other valve member. An operating rod 11 extends through the bonner member 12, and is movable in opposite directions between full open and closed valve positions. In the position illustrated it is assumed that the corresponding valve member is fully open. Suitable means such as seal rings 13 of the O-ring type, can be applied to prevent leakage past the operating rod.

The exterior end of the operating rod is loosely connected to an operating lever 14. The arrangement is such that the lever may pivot about the operating rod, or may be moved a limited distance in the direction of its length. The simple arrangement shown employs a flattened end portion 15 on the operating rod 11, which is provided with pins or studs 16 and 17. The lever consists of two parallel bars 14a, which are disposed on opposite sides of the flattened portion 15, between the studs 16, 17. The fitting of the lever upon the flattened portion 15 is relatively loose, whereby the lever may be swung in opposite directions about a general pivot point between the studs 16, 17, or may be slid to different positions in the direction of its length.

The lever cooperates with a member 18 which is connected to the valve body, as by means of the pivotal connection 19. With the particular arrangement shown, the bonnet 12 is surrounded by the collar 21, and this collar forms a mounting for the pivot pin 19. Swinging movement of member 18 towards the rod 11, is shown being limited by the stop member 22.

One edge of the member 18 is provided with a plurality of notches 1, 2, 3 and 4, and the other edge may similarly be provided with the notches 5, 6 and 7. The lever 14 is provided with a pin 23 which can be selectively engaged in any one of the notches 1, 2, 3 or 4. Also the lever is shown provided with a pin 24, which can be selectively engaged in any one of the notches 5, 6 or 7.

Operation of my device can be explained as follows: As previously mentioned it is assumed in the present instance that the valve is a balanced one, and that the stem will remain in any given position irrespective of line pressure. Also it is assumed that the position of the operating rod shown in FIGURE 1 is for full open position. To close the valve, the operator slides the lever to retract the pin 23 from notch 4. Then the lever is turned in a clockwise direction and again slid forwardly to engage pin 23 with the notch 3. Thereafter the lever is turned in a counterclockwise direction, whereby downward force is applied to the operating rod 11 to move this rod toward closed position. After making about one-third the full travel of the stem towards closed position, the lever is slid to retract pin 23 from notch 3, and thereafter pin 23 is engaged with notch 2. It will be evident that this step-by-step movement will serve to move the operating rod to full closed position, at which time the pin 23 may be in engagement with notch 1. To open the valve the same step-by-step movement is carried out, but reversely, until the pin 23 is finally in the notch 4.

It will be noted that the lever 14 can be moved to a position to bring the pin 24 into engagement with one of the notches 5, 6 or 7. With this engagement the stem again can be moved step by step, between full open and closed positions. However, the mechanical advantage is substantially less, because the pin 24, when in engagement with one of the notches 5, 6 or 7, is at a greater distance from the operating rod, in contrast with the relatively short lever arm distance when pin 23 is in engagement with one of the notches 1, 2, 3 or 4. In instances where there is a considerable resistance to movement, the notches 1, 2, 3 and 4 are employed to obtain maximum mechanical advantage. However, if the resistance is not great then the other row of notches is employed, with less mechanical advantage, but with greater rate of movement of the operating rod.

If desired, member 18 can be positioned to the right side of pin 24, and this pin engages with notches 1, 2, 3 and 4, for a step by step raising or lowering of rod 11. This provides greater rate of movement but less mechanical advantage than the methods of use described above.

Figure 4:
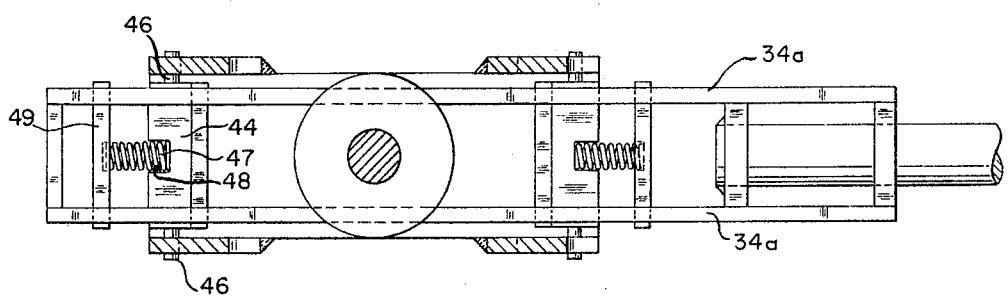
FIGURE 4 is a plan view of the operator shown in FIGURE 3.

The embodiment shown in FIGURE 4 is suitable for use with a valve which is not balanced, and it also incorporates the feature of locking the valve in a given position. In this instance the valve operating rod 31 is provided with the spaced abutments 32 and 33, adjacent the upper and lower sides of the operating lever 34. The means cooperating with the lever 34 includes the members 36 and 37, which constitute two pairs of upstanding members, having their lower ends attached to the mounting plate 38. This plate in turn is attached to the bonnet 39 of the valve body. At their upper ends the members 36 and 37 are joined together by the plate 41.

The members 36 and 37 have their inner and outer edges provided with notches 36a, 36b, and 37a, 37b. A convenient way to manufacture the plates 36 and 37 is to torch cut them from steel plates, with the cutting torch being traced to provide the notches 36a, 36b and 37a, 37b.

The lever 34 carries devices for selectively engaging the notches just described. These devices are designated generally 42 and 43, and may be duplicated. Thus each device can consist of a bar 44, having pins 46 extending from its ends. A coiled compression spring 47 is seated within the slots 48 formed in the bar 44. The other end of the compression spring is seated upon the adjacent bar 49.

Figure 3:
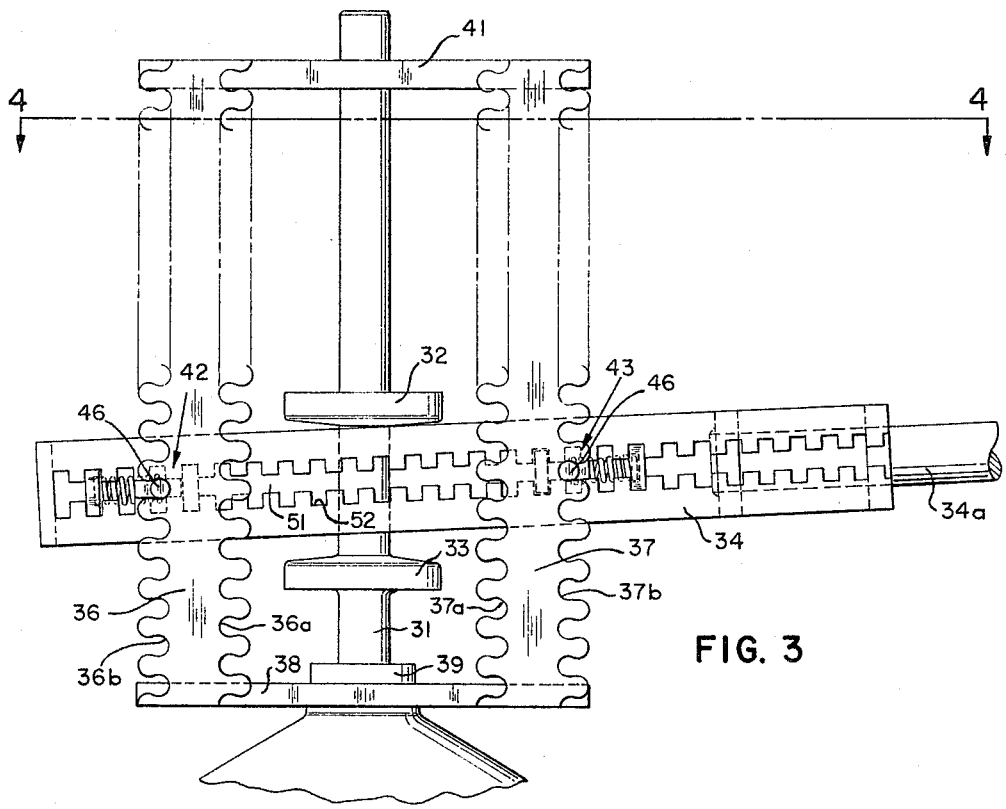
FIGURE 3 is a side elevational view illustrating another embodiment of the invention.

Each of the members 34a constituting the lever 34 is provided with a longitudinal slot 51, and transverse slots 52. The end portions of the bar 44 are loosely accommodated within the slots 51, and the end portions of the bar 49 are loosely accommodated in transverse slots 52. With this arrangement it will be evident that the bar 49 is held in a selected position, and that the bar 44 is spring urged toward the adjacent members 36. As illustrated in FIGURE 3 the pins 46 are engaged within one set of notches 36b.

As previously stated the device 43 can be identical to the device 42. However in this instance the pins 46 are spring urged toward the adjacent notches 37b.

Operation of the apparatus shown in FIGURES 3 and 4 is as follows. Normally both sets of pins 46 will be engaged within slots 36b, 37b, thus locking the lever and rod 31 against movement. Assuming that it is desired to raise the operating rod 31, the operator grasps the extension 34a of the lever 34, and then disengages the pins 46 of device 43, by pulling the lever in the direction of its length to the right as viewed in FIGURE 3. The lever 34 is now raised, whereby it pivots about the pins 46 of device 42, thus raising the operating rod 31 a short distance. When the pins 46 of device 43 have reached the level of the next higher set of notches 37b, the lever is moved to the left as viewed in FIGURE 3, thus engaging the pins 46 of device 43, and such movement is continued until the pins 46 of device 42 are disengaged from the notches 37b. Thereafter the lever 34 is lowered, or in other words turned in a clockwise direction, to cause it to pivot about the pins 46 of device 43. Then the lever is again moved to the right as viewed in FIGURE 3, thus causing the pins 46 of device 42 to engage the next higher set of notches 36b. It will be evident that this step-by-step action can be continued until the operating rod 31 has been raised to the extent of its permissible movement. Similarly the operating rod can be moved downwardly step by step, to the limit of its movement. If it is desired to increase the mechanical advantage, then the positioning of the devices 42 and 43 is changed so that the pins 46 are spring urged into the notches 36a and 37a.

With the mode of operation described above for FIGURES 3 and 4, it will be evident that the operator at all times has control over the positioning and movement of the operating rod, and when the lever is released, it returns to a locking position.

Figure 5:
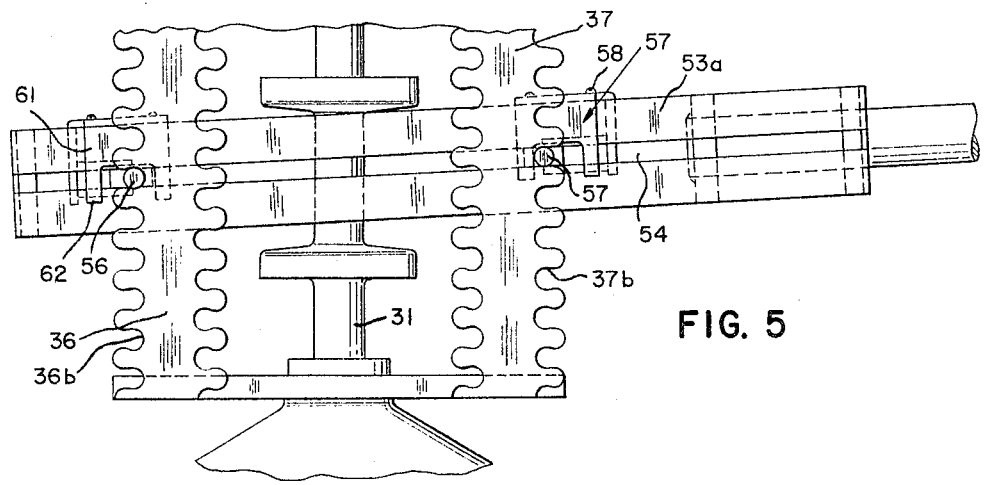
FIGURE 5 is a side elevational view showing another embodiment.
Figure 6:
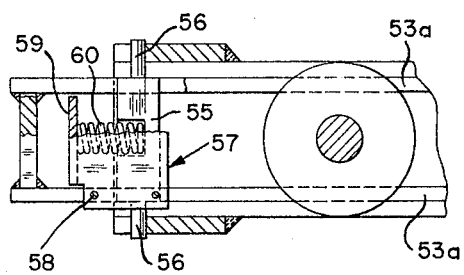
FIGURE 6 is a plan view of the device as shown in FIGURE 5, partly in section.

In the embodiment of FIGURES 5 and 6, the upstanding members 36 are the same as in FIGURES 3 and 4. However, the construction of the means for engaging the notches 36b, 37b is somewhat different. The two portions 53b are formed to provide the longitudinal slots 54. The bars 55 are substantially the same as the bars 44 of FIGURE 4, and the pins 56 carried by the ends of these bars are adapted to engage within the notches. In place of bars 44 of FIGURES 3 and 4, I provide retaining devices 57 that are adjustably secured to the lever portions 53a as by screws 58. The wall portion 59 of each device 57 forms a seat for one end of the compression spring 60. Devices 57 also provide depending side walls 61 which form stop lugs 62 disposed on opposite sides of the pins 56. These lugs serve to limit movement of the pins 56 and the bars 55 during operation of the device.

In general, the apparatus shown in FIGURES 5 and 6 operates in the same manner as the apparatus previously described in connection with FIGURES 3 and 4. Normal static position of lever 52 serves to lock the valve rod 31 against movement in either direction. By manual movement of the lever in the direction of its length accompanied by rocking movement as previously described, the pins 56 can be successively engaged with the notches to move the operating rod 31 upwardly or downwardly as desired.

I claim:

1. In combination with a valve having a body and an operating rod extending from the body and movable in opposite directions between full open and closed positions, means for operating said rod comprising a lever connected to the rod, said connection permitting both rocking of the lever relative to the rod and movement of the lever in the direction of its length relative to the rod, notched members on opposite sides of the operating rod and extending in a direction substantially parallel to the rod, and pin means carried by the lever means and selectively engageable in said notched members, the notches in said members being open to selectively receive said pin means.

2. A valve operator as in claim 1 in which spring means urges said pin means in opposite directions.

3. In combination with a valve having a body and an operating rod extending from the body and movable in opposite directions between the fully opened and closed positions, means for operating said rod comprising a lever means, step means connected to the body, the step means comprising a member having a series of open notches and adapted to extend spaced from and in the same general direction as the operating rod, and means forming an operating connection between the lever means and the rod, said last means permitting angular rocking movement of the lever means relative to the rod and also permitting movement of the lever means in the direction of its length and laterally of the operating rod, a portion of the lever means being engageable in a selected one of said notches by movement of the same in the direction of its length, angular rocking movement of the lever means serving to move the rod in on direction or the other with mechanical advantage.

4. Valve operating means as in claim 3 in which said member has two series of notches formed in the same, the notches being disposed at different distances ftom the operating rod, said lever means being selectively engageable with a notch in either one of the two series by movement of the same in the direction of its length.

5. A valve operator as in claim 2 in which the pin means comprises pins carried by bars, the lever being longitudinally slotted to slidably carry said bars, the spring means serving to urge the bars and the pins toward the notched members whereby the pins normally are engaged with the notches of said members, the connection between the lever and the operating rod including means on the rod abutting the upper and lower sides of the lever when the operating rod is vertical.

References Cited by the Examiner
UNITED STATES PATENTS 1,416,391  5/1922  Van Brunt _____ 251—234

WILLIAM F. O'DEA, *Primary Examiner.*

ISADOR WEIL, *Examiner.*

D. A. ROWE, D. R. MATTHEWS, *Assistant Examiners.*